United States Patent
Zhong

(10) Patent No.: US 12,358,547 B2
(45) Date of Patent: Jul. 15, 2025

(54) BABY STROLLER AND BACKREST ANGLE ADJUSTING MECHANISM THEREOF

(71) Applicant: WONDERLAND SWITZERLAND AG, Steinhausen (CH)

(72) Inventor: Zhiren Zhong, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 60 days.

(21) Appl. No.: 18/507,773

(22) Filed: Nov. 13, 2023

(65) Prior Publication Data

US 2024/0083486 A1 Mar. 14, 2024

Related U.S. Application Data

(63) Continuation of application No. 17/458,875, filed on Aug. 27, 2021, now Pat. No. 11,851,100.

(30) Foreign Application Priority Data

Aug. 28, 2020 (CN) .............................. 202021852682

(51) Int. Cl.
*B62B 9/10* (2006.01)
*B62B 7/06* (2006.01)

(52) U.S. Cl.
CPC ................ *B62B 9/104* (2013.01); *B62B 7/06* (2013.01)

(58) Field of Classification Search
CPC ........... B62B 9/104; B62B 9/102; B62B 9/10; B62B 7/06
See application file for complete search history.

(56) References Cited

U.S. PATENT DOCUMENTS 8,764,048 B1 7/2014 Ahnert et al.
10,321,770 B2 * 6/2019 Pos ........................... B62B 9/12
(Continued)

FOREIGN PATENT DOCUMENTS

CN 102343930 B 8/2013
CN 203544082 U 4/2014
(Continued)

OTHER PUBLICATIONS

Office Action from Chinese Patent App. No. 202110638382.0 dated Jul. 21, 2022.
(Continued)

*Primary Examiner* — John D Walters
(74) *Attorney, Agent, or Firm* — Volpe Koenig

(57) ABSTRACT

The present invention discloses a backrest angle adjusting mechanism including a first support, a second support, a locking member and a reset member. The first and second supports are pivotally connected to each other and are respectively connected to a backrest tube and a stroller frame, and multiple engaging stages are formed between the first and second supports. The locking member is slidably provided between the first and second support, and has a lock position and a release position. The locking member is engaged at any engaging stage when at the lock position; when the driving member moves, the locking member is driven to slide and depart from the engaging stage and becomes located at the release position, thereby implementing angle adjustment of the backrest tube. During a folding process of the stroller frame, automatic folding of the backrest tube can be achieved by folding the frame stroller or by a seat fabric pulling the backrest tube that then moves with the stroller frame, thereby better simplifying operations of angle adjustment of the backrest tube and folding of a (Continued)

baby stroller. The present invention further discloses a baby stroller having the backrest angle adjusting mechanism.

20 Claims, 14 Drawing Sheets

(56) References Cited

U.S. PATENT DOCUMENTS 10,945,534 B2 * 3/2021 Zhong .................. B62B 9/12
2022/0063697 A1    3/2022 Zhong

FOREIGN PATENT DOCUMENTS

| CN | 104273982 A | 1/2015 |
| CN | 105984481 A | 10/2016 |
| CN | 106143575 A | 11/2016 |
| CN | 205819300 U | 12/2016 |
| CN | 106828579 A | 6/2017 |
| CN | 207106576 U | 3/2018 |
| CN | 108146487 A | 6/2018 |
| CN | 208585309 U | 3/2019 |
| CN | 208855702 A | 5/2019 |
| CN | 209305640 U | 8/2019 |
| CN | 110371176 A | 10/2019 |
| CN | 209700773 U | 11/2019 |
| CN | 110775133 A | 2/2020 |
| DE | 10216217382 A1 | 3/2017 |
| DE | 102016217382 A1 * | 3/2017 | ............... B62B 7/06 |

OTHER PUBLICATIONS

Office Action from Taiwanese Patent App. No. 11-131792 dated Sep. 5, 2022.
Mechanical translation of CN108146487A, Jun. 2018.

* cited by examiner

BABY STROLLER AND BACKREST ANGLE ADJUSTING MECHANISM THEREOF

This application is a continuation of the U.S. patent application Ser. No. 17/458,875 filed on Aug. 27, 2021, and claims priority under 35 U.S.C. § 119 to Chinese patent application no. 202021852682.6, filed Aug. 28, 2020, the entirety of which is incorporated by reference herein.

BACKGROUND OF THE INVENTION

Field of the Invention

The present invention relates to the technical field of baby and infant carriers, and more particularly, to a backrest angle adjusting mechanism capable of angle adjustment and automatic folding and unfolding along with a stroller frame, and a baby stroller having the mechanism.

Description of the Prior Art

Baby and infant carriers are extensively applied in families with babies and infants. Versatile baby and infant carriers provide immense convenience for carrying babies and infants. For example, a baby stroller brings all kinds of conveniences for outdoor activities of babies and infants. In addition, most baby strollers are designed as a foldable mechanism so as to be readily stored and carried. Meanwhile, a backrest on a baby stroller is generally designed as an adjustable mechanism so as to ensure seating comfort of babies and infants.

To realize adjustment of a backrest, a locking mechanism is usually provided on a pivotal position of each of two ends of the backrest, and the backrest may then be adjusted by operating and releasing the locking mechanisms. However, the locking mechanisms on both sides need to be released by simultaneous operations of both hands, leading to a quite inconvenient manipulation, in particular for situations where only one hand is available for the manipulation. Moreover, when the baby stroller is folded, the seat and the backrest thereof are usually incapable of automatically folding along with the stroller frame, leading to complications in the folding operation.

Therefore, there is a need for a mechanism capable of implementing angle adjustment of a backrest and automatic folding and unfolding the backrest along with a stroller frame, and a baby stroller having the mechanism, so as to resolve the issues of the prior art.

SUMMARY OF THE INVENTION

It is an object of the present invention to provide a backrest angle adjusting mechanism capable of implementing angle adjustment of a backrest tube and automatically folding the backrest tube along with a stroller frame.

It is another object of the present invention to provide a baby stroller capable of implementing angle adjustment of a backrest tube and automatically folding the backrest tube along with a stroller frame.

To achieve the objects above, a technical solution of the present invention provides a backrest angle adjusting mechanism for adjusting an angle of a backrest tube relative to a stroller frame of a baby stroller. The backrest angle adjusting mechanism includes a first support, a second support, a locking member, a driving member and an adjusting member. The first support is for connecting to one between the backrest tube and the stroller frame. The second support is pivotally connected to the first support, and is for connecting to the other between the backrest tube and the stroller frame, and a plurality of engaging stages are formed between the first support and the second support. The locking member is slidably arranged between the first support and the second support, and has a lock position and a release position. The locking member is engaged at any of the engaging stages when at the lock position, and the locking member is driven to slide and depart from the engaging stage so as to be located at the release position when the first support and the second support are relatively pivotally rotated. The driving member is movably arranged between the first support and the second support and matches with the locking member. The locking member may be driven by moving of the driving member so as to slide to the release position. The adjusting member is connected to the driving member, and is for driving the driving member to move.

Preferably, the backrest angle adjusting mechanism further includes a reset member. The reset member is arranged between the first support and the second support and interferes with the locking member, and the reset member provides the locking member with a tendency of constantly sliding from the release position to the locking position.

Preferably, the locking member is simultaneously engaged with the first support and the second support when located at the lock position, and the locking member departs from the first support or the second support when slid to the release position.

Preferably, the locking member is provided with at least one tooth at an interval along a circumferential direction thereof, the first support and the second support are provided with a plurality of slots matching with the tooth, and the tooth is selectively fitted in any of the slots.

Preferably, inner walls of the first support and the second support are correspondingly provided with a plurality of engaging blocks in a projecting manner, and the slot corresponding to the tooth is formed between the two adjacent engaging blocks.

Preferably, a first driving sloped surface is formed on an end portion of the engaging block; when the first support and the second support are relatively pivotally rotated, the first driving sloped surface pushes the tooth so as to slide the locking member to the release position.

Preferably, the reset member and the driving member are arranged on two sides of the locking member, respectively.

Preferably, the driving member has a second driving sloped surface exhibiting an included angle relative to a moving direction thereof, and a side surface of the locking member is provided with a driven sloped surface matching with the second driving sloped surface; when the driving member moves, the second driving sloped surface pushes the driven sloped surface so as to slide the locking member to the release position.

Preferably, the moving direction of the driving member and a sliding direction of the locking member are staggered.

Preferably, the locking member is slidable along a pivot axis of the first support and the second support, and the driving member is movably arranged in a through manner at pivot axis by a long groove provided thereon.

Preferably, the driving member is provided with an engaging hole, a hook is formed on one end of the adjusting member, the hook is connected in the engaging hole, and the other end of the adjusting member extends out of the first support or the second support.

Preferably, a connecting pipe is provided in a protecting manner on an upper end of the first support or the second support, the connecting pipe is for connecting the backrest tube, two spaced ribs are provided in a projecting manner on an outer wall of the connecting pipe, and the adjusting member is engaged between the two ribs.

Preferably, a through hole is provided on the first support or the second support corresponding to a position between the two ribs, and the adjusting member extends out of the first support or the second support through the through hole.

Preferably, a first accommodating cavity is formed at the first support, a first column is provided in a projecting manner in the first accommodating cavity, a second accommodating cavity matching with the first accommodating cavity is provided on the second support, a second column corresponding to the first column is provided in a projecting manner in the second accommodating cavity, the pivot axis of the first support and the second support is arranged in a through manner at the first column and the second column, and all the reset member, the locking member and the driving member are arranged in a through manner at the first column and the second column.

Preferably, a first limiting block is further provided in a projecting manner at a bottom of the first support and a second limiting block is further provided in a projecting manner at a bottom of the second support; when the first support and the second support are relatively pivotally rotated, the first limiting block and the second limiting block mutually interfere so as to limit a position of the backrest tube.

Preferably, the backrest angle adjusting mechanism further includes a third support fixed at the stroller frame. The first support is connected to the backrest tube, the second support is pivotally connected between the first support and the third support and is connected to the stroller frame, and the stroller frame drives the second support to pivotally rotate relative to the third support when folded or unfolded so as drive the backrest tube to fold or unfold.

Preferably, a connecting ear is provided in an upward projecting manner on a top side edge of the second support, and the connecting ear is provided with a connecting column in a vertically projecting manner and is connected to the stroller frame by the connecting column.

Preferably, a first interference portion is formed at a joint between the connecting ear and the top side edge of the second support, a second interference portion matching with the first interference portion is formed on an outer edge of the third support, and a rotation position of the second support is limited by matching of the first interference portion and the second interference portion.

Correspondingly, the present invention further provides a baby stroller including a stroller frame, a seat, a backrest tube and a backrest angle adjusting mechanism. The seat is arranged at the stroller frame, and two ends of the backrest tube are connected to two rear sides of the seat by the backrest angle adjusting mechanism, respectively.

Preferably, the adjusting members of the two backrest angle adjusting mechanisms are connected into an integral, and the locking members of the two backrest angle adjusting mechanisms are driven and released synchronously by the adjusting members.

Preferably, the two adjusting members are formed of a rigid material into a substantially U-shaped structure.

Preferably, the backrest angle adjusting mechanism further includes a third support. The third support is fixed at a rear side portion of the seat, the first support is fixed at an end portion of the backrest tube, the second support is pivotally connected between the first support and the third support, and the baby stroller drives the second support to pivotally rotate relative to the third support when folded or unfolded so as to drive the backrest tube to fold or unfold.

Preferably, the stroller frame includes a stroller arm and a front leg that are pivotally connected, the seat is pivotally connected to the front leg by the seat pipe, a frame linking rod is pivotally connected between the stroller arm and the seat pipe, the second support is connected to the frame linking rod, and the stroller arm drives the second support to rotate by the frame linking rod when pivotally rotated.

DETAILED DESCRIPTION OF THE EMBODIMENTS

Figure 1:
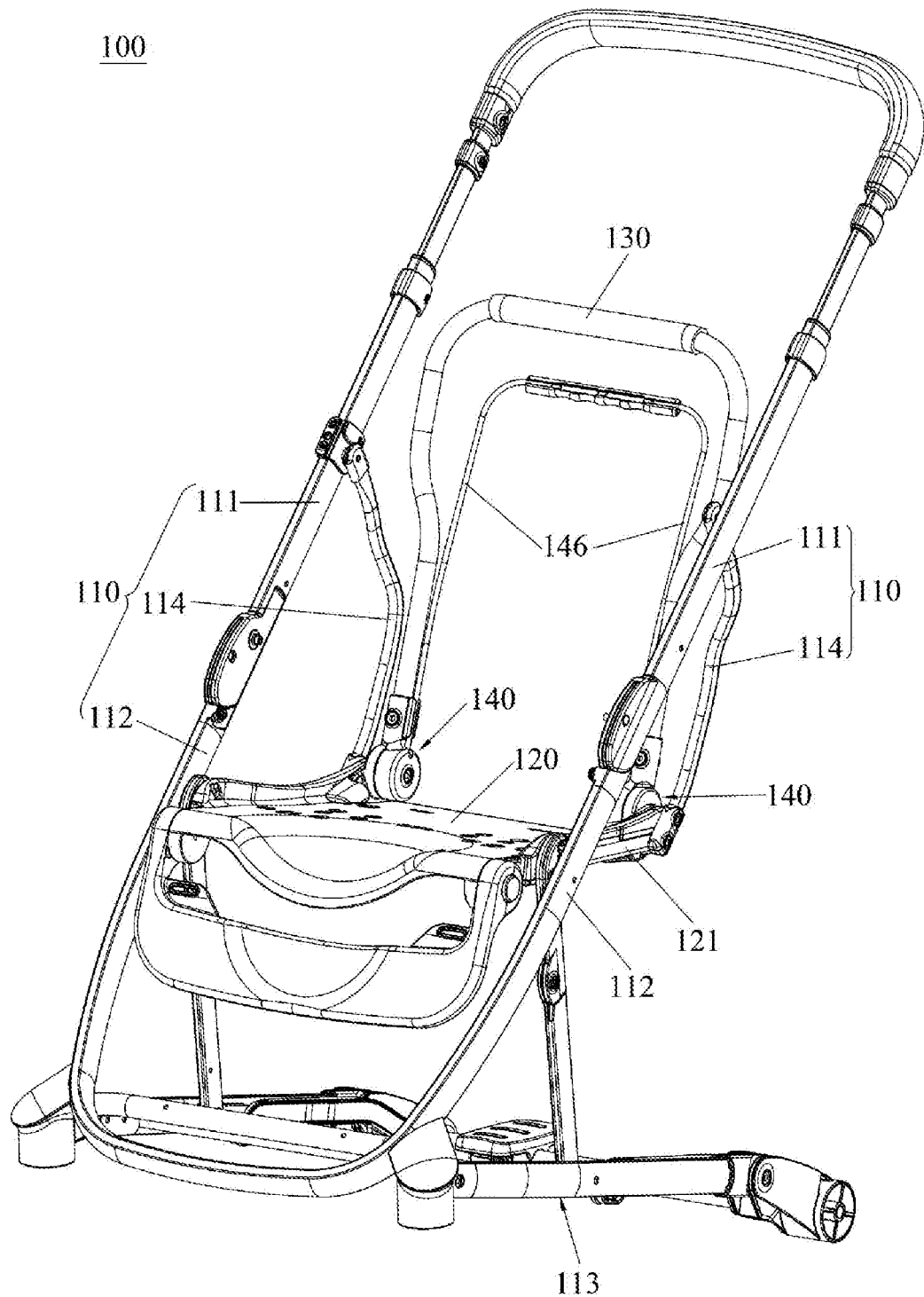
FIG. 1 is a structural schematic diagram of a baby stroller with wheels removed according to an embodiment of the present invention.

Embodiments of the present invention are described with reference to the accompanying drawings, wherein similar element denotations and numerals in the drawings represent similar components.

Referring to FIG. 1 to FIG. 14, a baby stroller 100 provided by the present invention includes a stroller frame 110, a seat 120, a backrest tube 130 and a backrest angle adjusting mechanism 140. The seat 120 is mounted at the stroller frame 110, and two ends of the backrest tube 130 are respectively connected to two sides of a rear end of the seat 120 by two backrest angle adjusting mechanisms 140. When the baby stroller 100 is unfolded and is in a state of use, the angle of the backrest tube 130 relative to the seat 120 is adjustable by the backrest angle adjusting mechanism 140. When the baby stroller 100 is folded, the stroller frame 110 is capable of pulling the backrest tube 130 by folding thereof or by a seat fabric (not shown) to move to the front of the baby stroller 100 so as to drive the baby stroller 100 to fold in synchronization. When the stroller frame 110 is unfolded, the backrest 130 can be driven to pivotally rotate and unfold in synchronization.

More specifically, the stroller frame 110 includes a stroller arms 111, front legs 112, a chassis 113 and frame linking rods 114. The stroller arm 111 is pivotally connected to the front leg 112, a bottom end of the front leg 112 is pivotally connected to the chassis 113, and the chassis 113 is used for installing wheels (referring to FIG. 8). Moreover, two seat pipes 121 are individually pivotally connected to the front legs 112, and the two seat pipes 121 extend toward the rear of the stroller frame 110. The seat 120 is mounted on the two seat pipes 121. An upper end of the frame linking rod 114 is pivotally connected to the stroller arm 111, and a lower end thereof is pivotally connected to a rear end of the seat pipes 121. When the stroller 110 is unfolded to the state of use, the stroller arm 111 and the front leg 112 extend in a substantially straight line, and the frame linking rod 114 supports between the seat pipe 121 and the stroller arm 111. When the stroller frame 110 is folded, the stroller arm 111, the front leg 112 and the chassis 113 can be relatively pivotally rotated and folded. During this process, the stroller arm 111 drives and moves the seat pipe 121 through the frame liking rod 114, so as to implement synchronous folding of the seat 120.

In combination with FIGS. 1 to 7, in one embodiment of the present invention, each backrest angle adjusting mechanism 140 includes a first support 141, a second support 142, a reset member 143 and a locking member 144. The second support 142 is fixed on a rear side of the seat 120. The first support 141 and the second support 142 are pivotally connected and are connected to an end portion of the backrest tube 130, and multiple engaging stages are provided between the first support 141 and the second support 142. The locking member 144 is slidably arranged between the first support 141 and the second support 142, and has a lock position and a release position. The locking member 144 is engaged at any of the engaging stages when at the lock position. When the first support 141 is rotated by an external force, the locking member 144 is driven to slide and depart from the engaging stage so as to be at the release position. At this point, the first support 141 and the second support 142 relatively and freely rotate pivotally, hence accordingly adjusting the angle of the backrest tube 130 relative to the seat 120, or folding the backrest 130 along with the stroller frame 110 under driving of the seat fabric. The reset member 143 is provided in the first support 141 and the second support 142, and interferes with the locking member 144. The reset member 143 provides the locking member 144 with a tendency of constantly sliding from the release position to the lock position. It is understandable that positions for arranging the first support 141 and the second support 142 may be swapped.

In the present invention, the reset member 143 is, for example but not limited to, preferably a spring, and may be implemented by other elastic elements that help reset the locking members 144.

Again referring to FIGS. 5 to 7, the backrest angle adjusting mechanism 140 further includes a driving member 145 and an adjusting member 146. The driving member 145 is movably provided between the first support 141 and the second support 142, and matches with the locking member 144, and a moving direction of the driving member 145 and a sliding direction of the locking member 144 are staggered. In this embodiment, the reset member 143 and the driving member 145 are arranged on two sides of the locking member 144, respectively. With moving of the driving member 145, the locking member 144 is driven to overcome an elastic force of the reset member 143 to slide to the release position. One end of the adjusting member 146 is connected to the driving member 145, and the other end of the adjusting member 146 extends out of the first support 141 or the second support 142. The driving member 145 is driven and moved by the adjusting member 146 so as to drive and slide the locking member 144.

In this embodiment, the locking member 144 is slidably arranged along a pivot axis 147 of the first support 141 and the second support 142, the reset member 143 interferes between the locking member 144 and the second support 142, the driving member 145 is arranged between the locking member 144 and the first support 141 and movably passes through the pivot axis 147, and the moving direction of the driving member 145 is perpendicular to the pivot axis 147. The adjusting member 146 extends into the first support 141 so as to be connected to the driving member 145. The locking member 144 is simultaneously engaged with the first support 141 and the second support 142 when located at the lock position, and the locking member 144 departs from the first support 141 when slid to the release position. It is to be noted that positions for arranging the reset member 143 and the driving member 145 may be swapped, and a position for arranging the adjusting member 146 is adjusted corresponding to the driving member 145.

Again referring to FIGS. 5 to 7, a first accommodating cavity 1411 is formed on the first support 141, a first column 1412 (referring to FIG. 6) is provided in a projecting manner in the first accommodating cavity 1411, a second accommodating cavity 1421 matching with the first accommodating cavity 1411 is provided on the second support 142, and a second column 1422 (referring to FIG. 7) corresponding to the first column 1412 is provided in a projecting manner in the second accommodating cavity 1421. When the first support 141 and the second support 142 are correspondingly connected, the first column 1412 and the second column 1422 are correspondingly interfere with each other, the pivot axis 147 is formed through the first column 1412 and the second column 1422 to pivotally connected the two, the reset member 143, the locking member 144 and the driving member 145 are all sleeved outside the first column 1412 and the second column 1422. Moreover, the locking member 144 is axially slidably along the first column 1412 and the second column 1422, and the sliding direction of the driving member 145 is perpendicular to the axial direction of the first column 1412 and the second column 1422.

Again referring to FIGS. 5 to 7, the locking member 144 is provided with at least one tooth 1441 (referring to FIG. 5) at an interval along a circumferential direction thereof, the first support 141 and the second support 142 are provided with a plurality of slots matching with the tooth 1441, and the tooth 1441 is selectively fitted in any of the slots, accordingly achieving positioning after adjusting the angle of the backrest tube 130. In this embodiment, a plurality of teeth 1441 are uniformly provided in a projecting manner along a circumferential direction of the locking member 144, such that the locking member 144 appears as a gear. An inner wall of the first support 141 is provided with a plurality of engaging blocks 1414 projecting toward the first column 1412, and a plurality of slots 1413 (referring to FIG. 6) matching with the tooth 1441 are formed between the two adjacent engaging blocks 1414. Correspondingly, an inner wall of the second support 142 is provided with a plurality of engaging blocks 1424 projecting toward the second column 1422, and a plurality of slots 1423 (referring to FIG. 5) corresponding to the slots 1413 of the first support 141 are formed between the two adjacent engaging blocks. Thus, when the backrest tube 130 is rotated by any angle, the locking member 144 is able to be engaged and positioned with the first support 141 and the second support 142.

Figure 5:
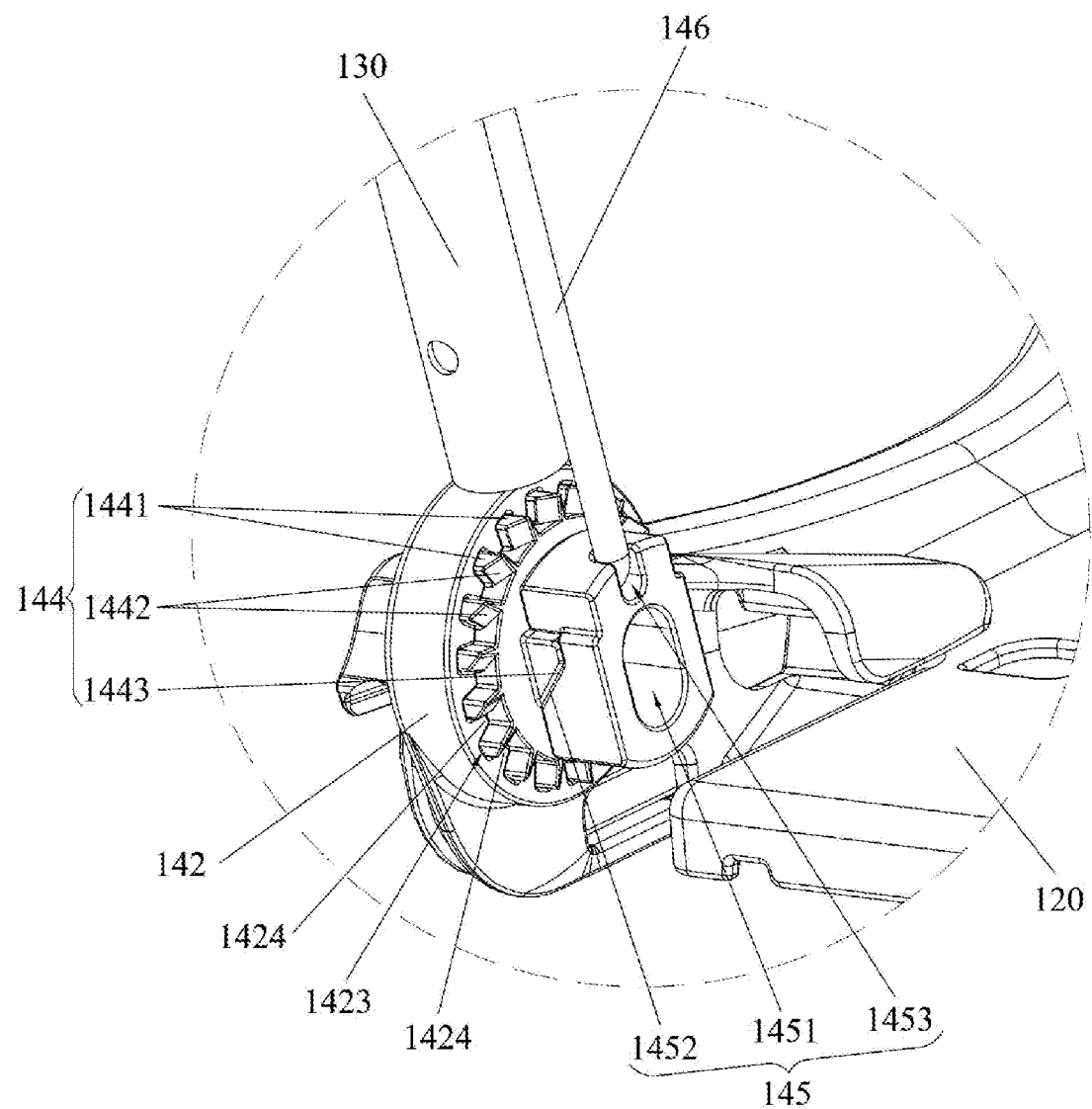
FIG. 5 is a structural schematic diagram of FIG. 4 with a first support removed.
Figure 6:
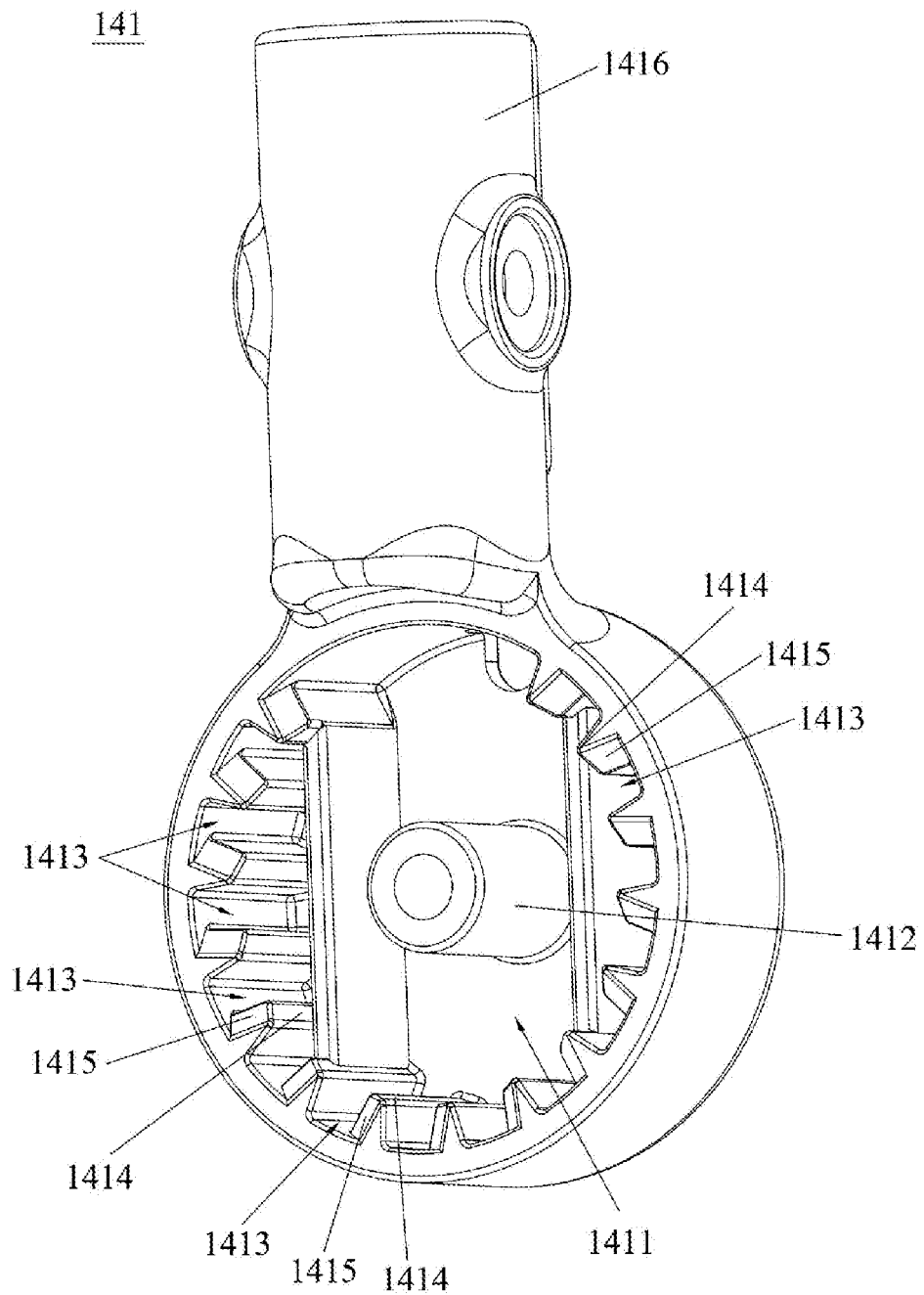
FIG. 6 is a structural schematic diagram of a first support in FIG. 4 from another angle.

Further, a first driving sloped surface 1415 is formed at an end portion of each engaging block 1414 of the first support 141, as shown in FIG. 6. Correspondingly, a sloped surface 1442 (referring to FIG. 5) is formed at an end portion of each tooth 1441 of the locking member 144. Thus, when the first support 141 is pivotally rotated relative to the second support 142 by an external force received, the first driving sloped surface 1415 pushes the sloped surface 1442 of the tooth 1441, such that the locking member 144 slides to the release position, that is, departing from the slot 1413 on the first support 141. Thus, with the first driving sloped surface 1415 provided, the backrest tube 130 is pulled and moved by the seat fabric during the folding process of the stroller frame 110 to further drive the backrest tube 130 to fold automatically.

Again referring to FIGS. 5 to 7, the driving member 145 is provided with a long groove 1451, and the driving member 145 movably arranged in a through manner at the first column 1412 using the long groove 1451 thereof. Moreover, a side portion of the driving member 145 is provided with a second driving sloped surface 1452 exhibiting an included angle relative to a moving direction thereof, and a side surface of the locking member 144 is provided with a driven sloped surface 1443 matching with the second driving sloped surface 1452. When the driving member 145 moves, the second driving sloped surface 1452 pushes the driven sloped surface 1443 so as to slide the locking member 144 to the release position.

Moreover, an upper end of the driving member 145 is provided with an engaging hole 1453, a hook 1461 is formed on one end of the adjusting member 146, and the hook 1461 is connected in the engaging hole 1453. The other end of the adjusting member 146 extends out of the first support 141, and drives the driving member 145 to move upward to further drive the locking member 144 to slide and become released when the adjusting member 146 is pulled upward.

Again referring to FIGS. 4, 6 and 7, a connecting pipe 1416 is provided in a protecting manner on an upper end of the first support 141, and is for connecting the backrest tube 130. Moreover, two spaced ribs 1417 are provided in a projecting manner on an outer wall of the connecting pipe 1416, and the adjusting member 146 is engaged between the two ribs 1417. On the first support 141, a through hole 1418 is provided on a position corresponding to the two ribs 1417, and the adjusting member 146 extends into the first support 141 through the through hole 1418 so as to connect to the driving member 145.

Figure 2:
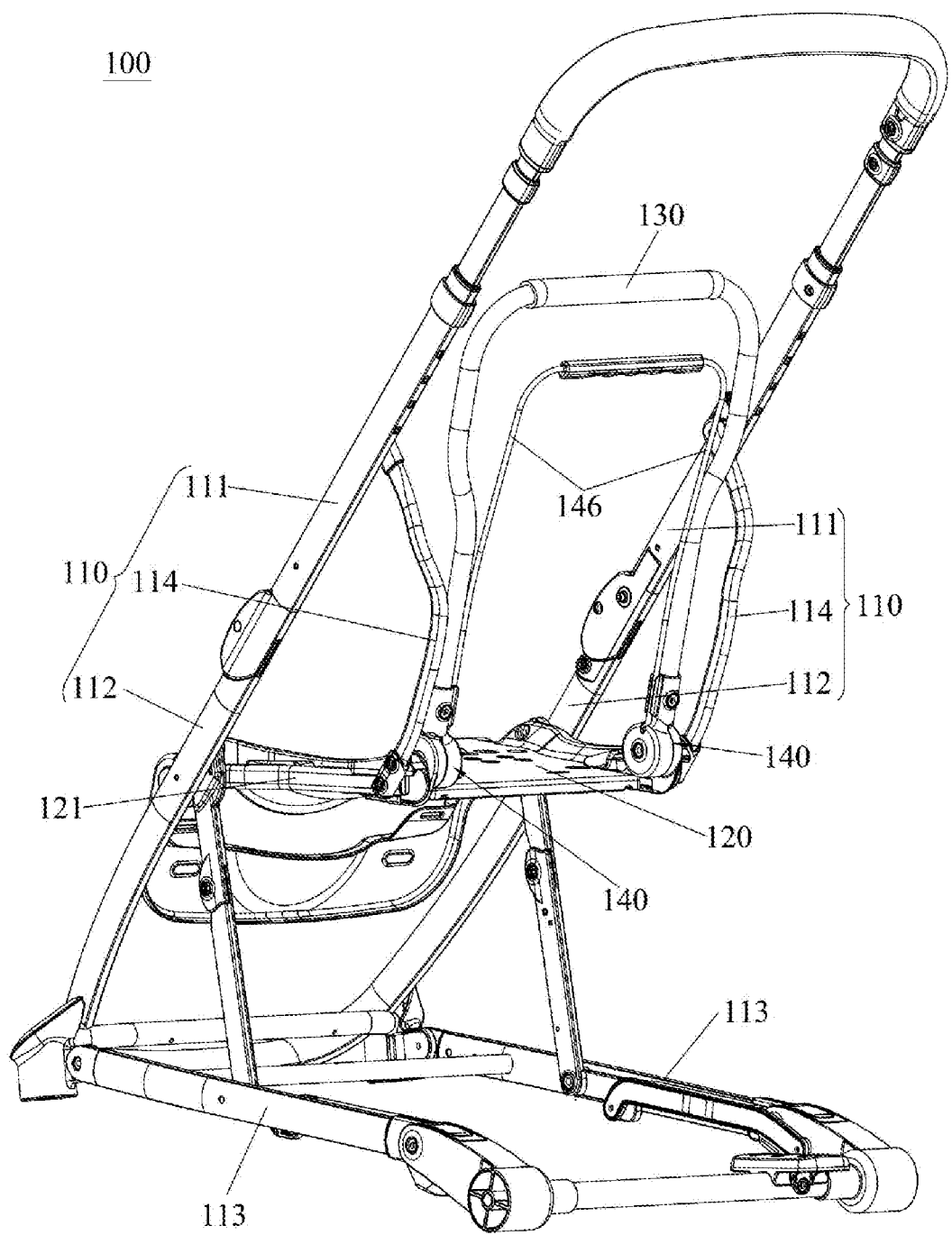
FIG. 2 is a structural schematic diagram of FIG. 1 from another angle.
Figure 3:
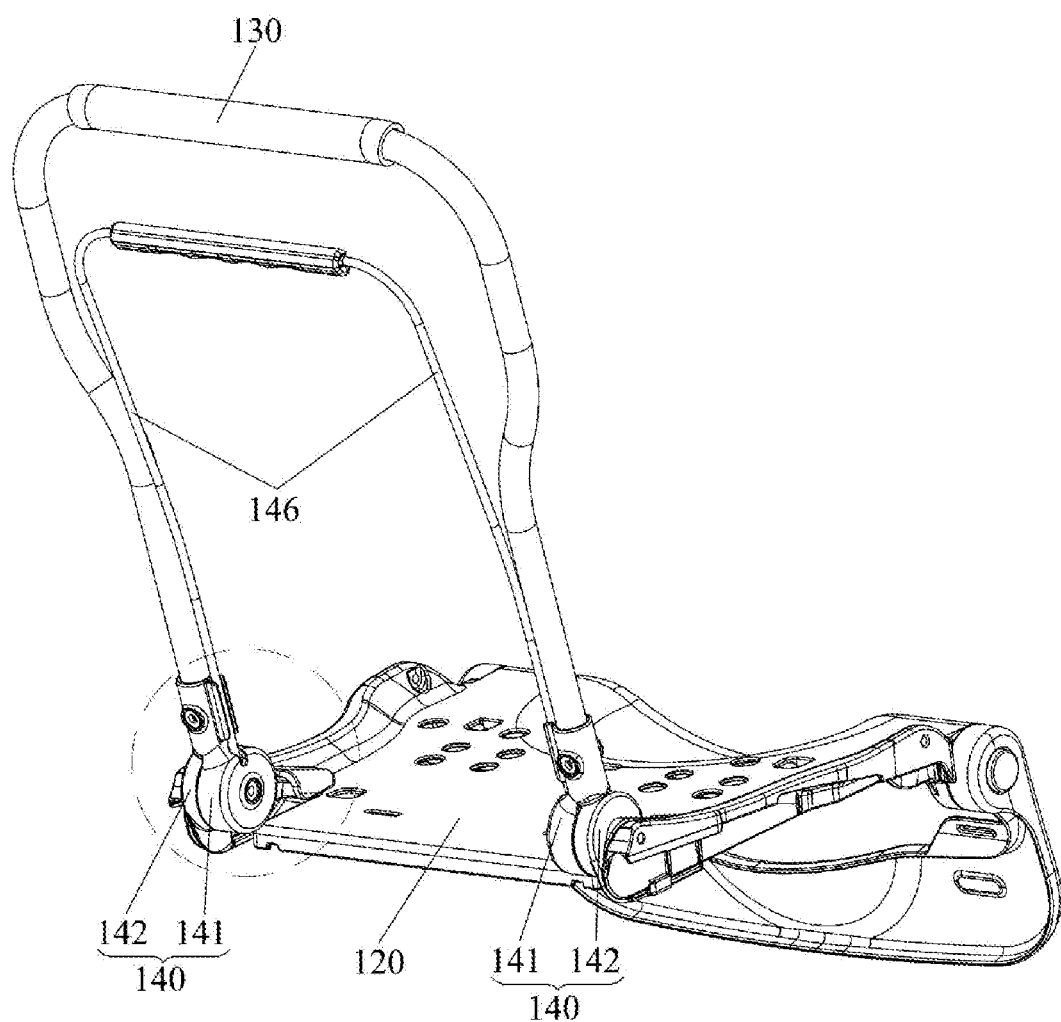
FIG. 3 is a structural schematic diagram of a backrest tube and a seat in FIG. 2 from another angle.
Figure 4:
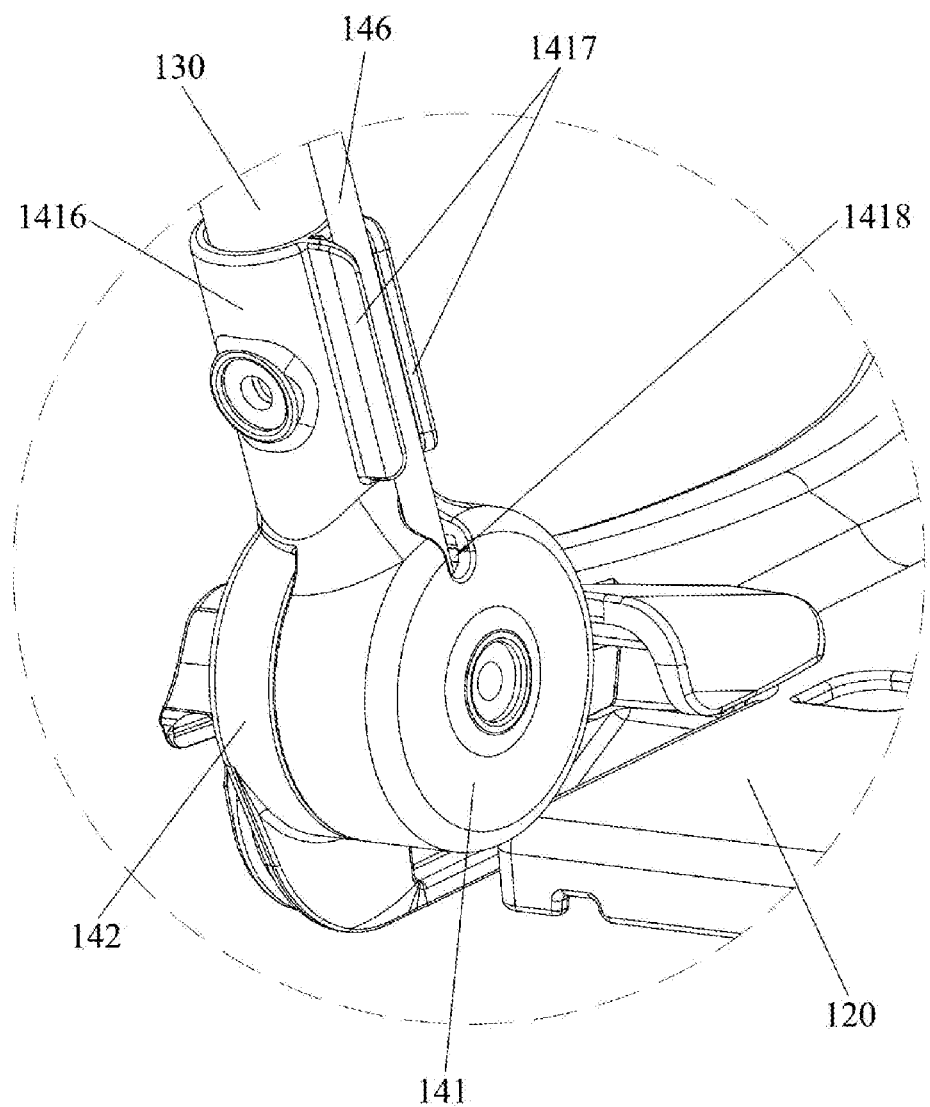
FIG. 4 is an enlarged schematic diagram of a backrest angle adjusting mechanism in FIG. 3.

In combination with FIGS. 1 to 3, in this embodiment, the adjusting members 146 of the two backrest angle adjusting mechanisms 140 are connected into an integral, and the two adjusting members 146 are preferably formed of a rigid material into a substantially U-shaped structure. As such, by pulling a joint between the two adjusting members 146 upward, the locking members 144 of the two backrest angle adjusting mechanisms 140 are synchronously driven and become released, thereby providing the backrest tube 130 with a more convenient angle adjustment operation.

In combination with FIGS. 1 to 7, adjustment and folding/unfolding processes and principles of the backrest angle adjusting mechanism 140 of the embodiment are described below.

First referring to FIGS. 1, 2, 5 and 7, when the baby stroller 100 is in a state of use, the stroller frame 110 is unfolded and locked. At this point, the frame linking rod 114 supports between the seat pipe 121 and the stroller arm 111, the backrest tube 130 is unfolded relative to the seat 120 to a position of use, the tooth 1441 of the locking member 144 at the same time is engaged in respective slots 1413 and 1423 of the first support 141 and the second support 142, hence achieving positioning of the backrest tube 130.

Figure 7:
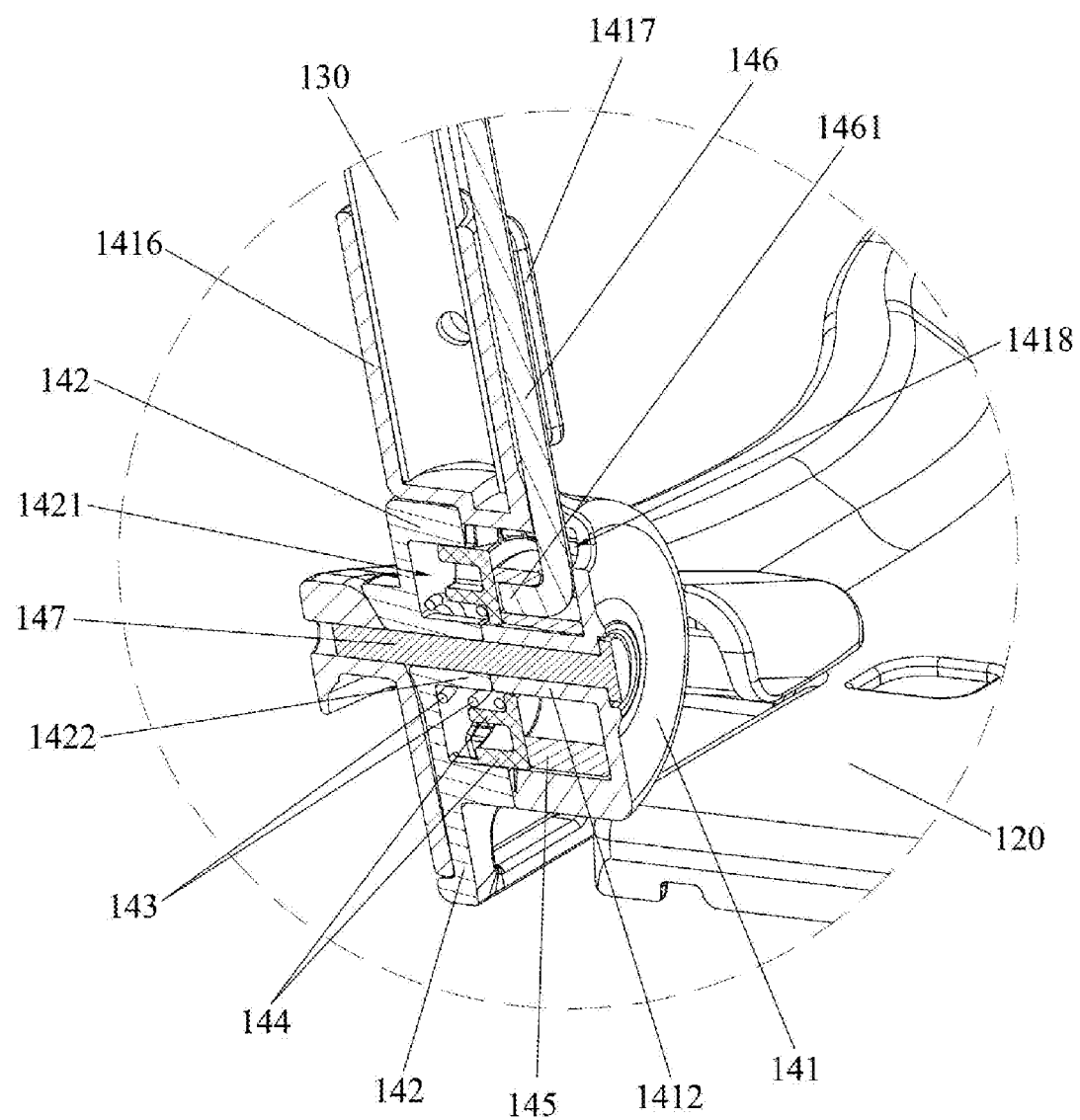
FIG. 7 is a section diagram of FIG. 4.

Referring to FIGS. 5 to 7, when the angle of the backrest tube 130 relative to the seat 120 is to be adjusted, the adjusting member 146 is pulled upward to drive the driving member 145 to move upward, and the second driving sloped surface 1452 on the driving member 145 pushes the driven sloped surface 1443 of the locking member 144 such that the locking member 144 slides and departs from the support 141. At this point, the backrest tube 130 can be pushed to drive the first support 141 to pivotally rotate relative to the second support 142, hence achieving angle adjustment of the backrest tube 130. During the process above, the reset member 143 is compressed and generates an elastic force.

Once the adjusting member 146 is released when the adjustment is completed, the reset member 143 restores its deformation and pushes the locking member 144 to slide along the second column 1422, and the tooth 1441 of the locking member 144 eventually again becomes engaged in another respective slots 1413 and 1423 of the first support 141 and the second support 142, hence achieving positioning of the backrest tube 130 after the adjustment.

Figure 13:
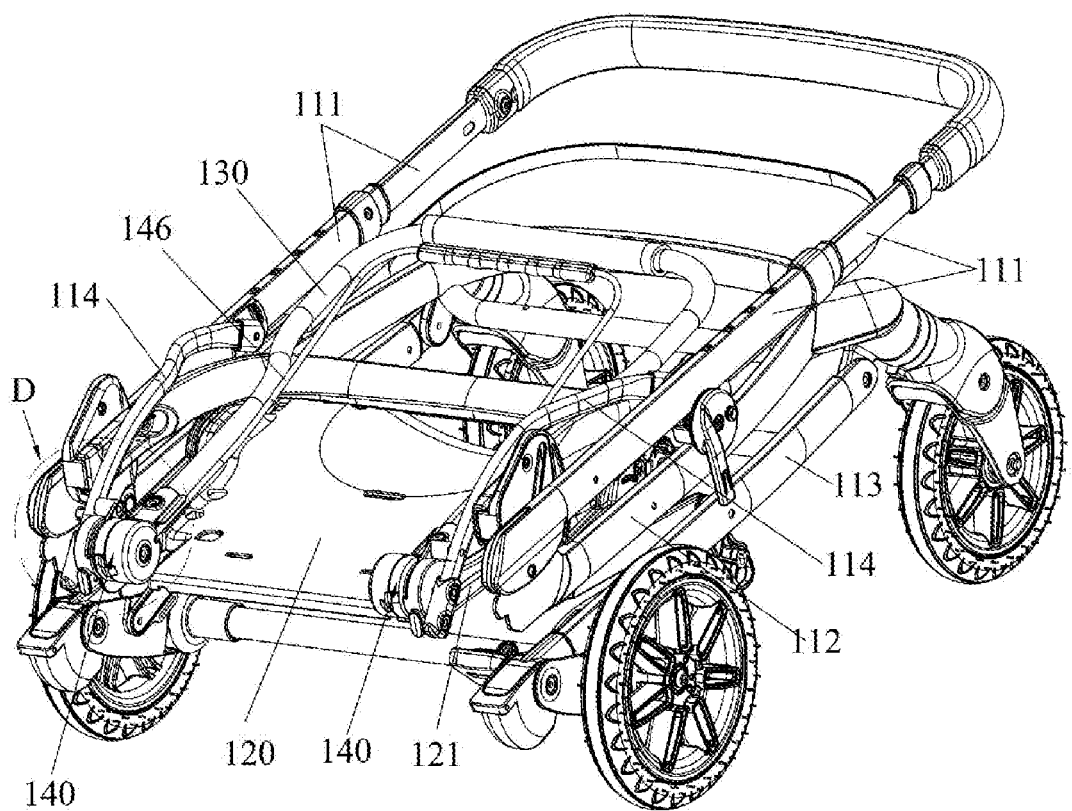
FIG. 13 is a schematic diagram of the baby stroller in FIG. 8 in a folded state.

Referring to FIGS. 1 to 3, to fold the baby stroller 100, the stroller arm 111 of the stroller frame 110 is pushed to pivotally rotate to the front of the baby stroller 100, the stroller arm 111 pivotally rotates relative to the front leg 112 and folds downward to approach the front leg 112, the front leg 112 at the same time pivotally rotates relative to and approaches the chassis 113, and the frame linking rod 114 drives the seat pipe 121 to move during the pivotal rotation of the stroller arm 111, such that the seat pipe 121 pivotally rotates relative to the front leg 112 to further drive and fold the seat 120. At this point, the backrest tube 130 is pulled by the seat fabric to move toward the front of the baby stroller 100. During this process, the backrest tube 130 drives the first support 141 to pivotally rotate relative to the second support 142, and the first driving sloped surface 1415 on the first support 141 pushes the tooth 1441 of the locking member 144, so as to slide the locking member 144 to the release position. Thus, the stroller frame 110 is able to drive the seat 120 and the backrest tube 130 to fold automatically, providing the baby stroller 100 with a simpler and more convenient folding operation. In a folded state, the stroller arm 111, the front leg 112, the chassis 113, the seat 120 and the backrest 130 are in a stacked state, as shown in FIG. 13.

Referring to FIGS. 8 to 14, the baby stroller 100 according to another embodiment of the present invention differs from the embodiment above merely in respect of a different structure of the backrest angle adjusting mechanism 140, while the remaining parts are identical and associated details are omitted herein.

In this embodiment, each backrest angle adjusting mechanism 140 includes a first support 141, a second support 142 and a third support 148. The third support 148 is fixed at a rear end of the seat 120, the second support 142 is simultaneously pivotally connected between the first support 141 and the third support 148, and the second support 142 is further fixed at the frame linking rod 114. Thus, the frame linking rod 114 is able to drive the second support 142 to pivotally rotate relative to the third support 148 during folding of the stroller frame 110 so as to further drive the entire backrest assembly to pivotally rotate and fold, and is able to drive the entire backrest assembly to pivotally rotate and unfold during unfolding of the stroller frame 110.

Figure 9:
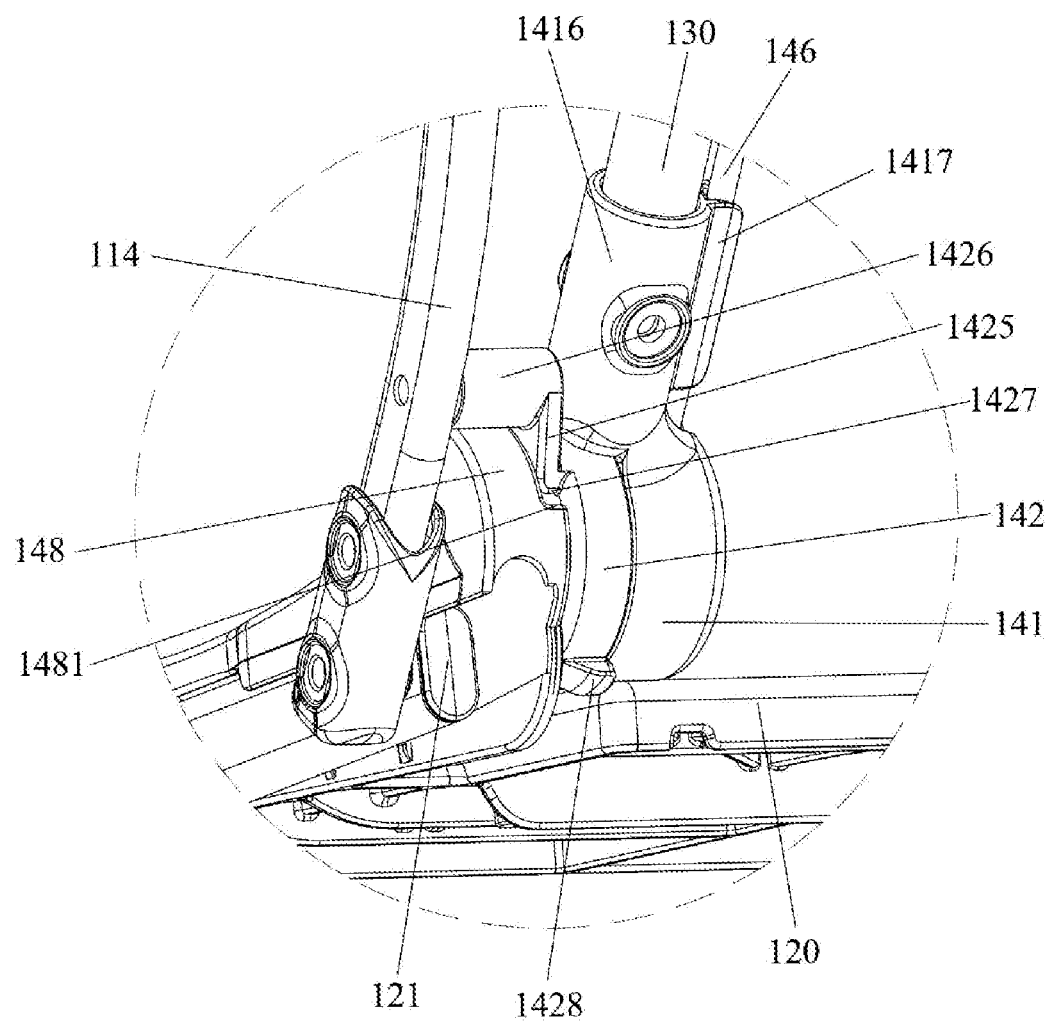
FIG. 9 is an enlarged schematic diagram of part A in FIG. 8.
Figure 10:
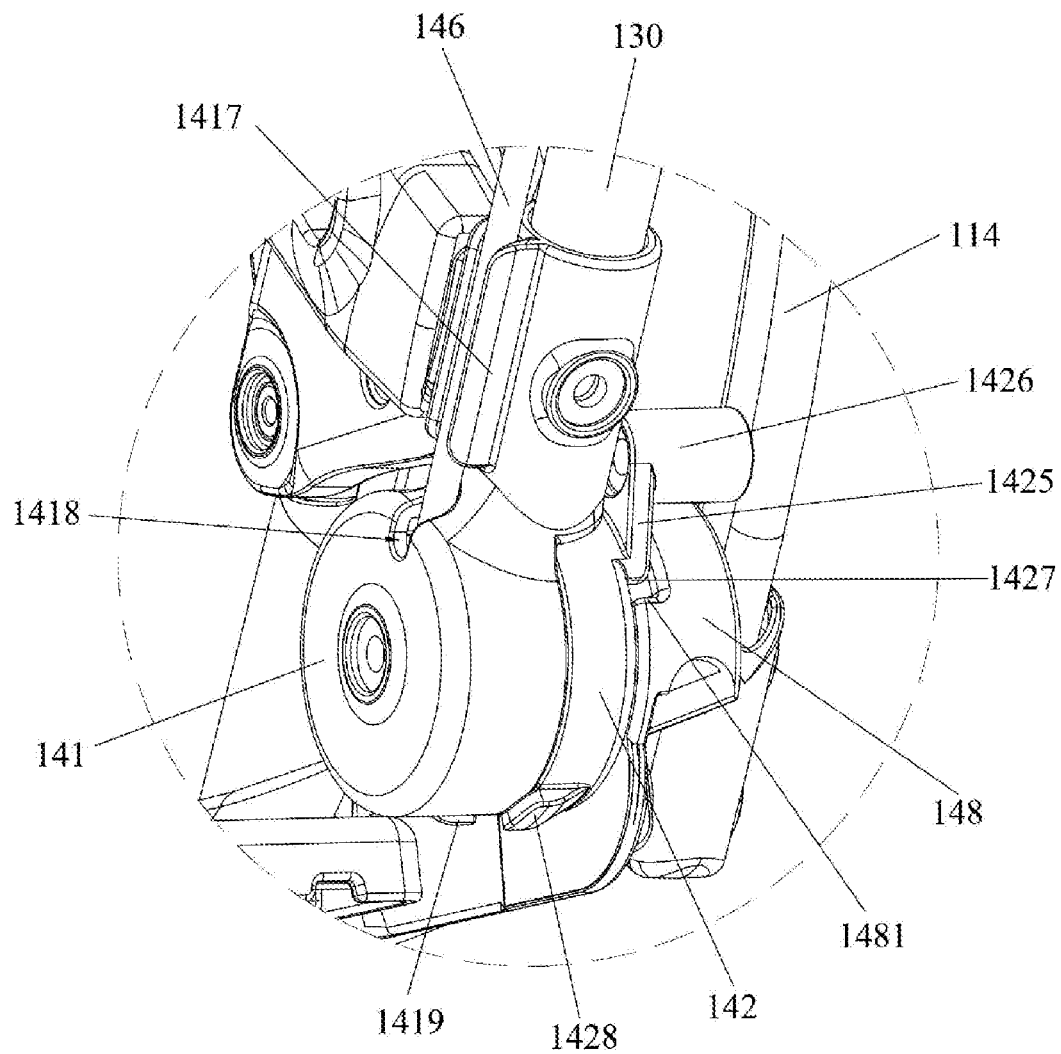
FIG. 10 is an enlarged schematic diagram of part B in FIG. 8.

More specifically, a top of the second support 142 is provided with a connecting ear 1425 extending upward, the connecting ear 1425 is provided with a connecting column 1426 in a vertically projecting manner and is fixed to the frame linking rod 114 by the connecting column 1426. Thus, when the frame linking rod 114 is rotated, the second support 142 connected thereto may be driven to rotate around the pivot axis between it and the third support 148. Moreover, a first interference portion 1427 is formed at a boss between the connecting ear 1425 and an outer edge of the second support 142, and a corresponding second interference portion 1481 is formed on an outer edge of the third support 143. When the stroller frame is unfolded, the first interference portion 1427 and the second interference portion 1428 are abutted against each other so as to limit the backward pivotal rotation position of backrest tube 130, as shown in FIGS. 9 and 10.

Referring to FIGS. 11 to 14, a first limiting block 1419 is further provided in a projecting manner at a bottom of the first support 141, and a second limiting block 1428 is further provided in a projecting manner at a bottom of the second support 142. When the first support 141 and the second support 142 are relatively pivotally rotated, the first limiting block 1419 and the second limiting block 1428 mutually interfere. Thus, once the stroller frame 100 is unfolded or folded, the first limiting block 1419 and the second limiting block 1428 mutually interfere so as to prevent the backrest tube 130 from being excessively pulled forward or backward.

In this embodiment, the structure and connection between the first support 141 and the second support 142 are the same as those of the embodiment above, and arrangements of the reset member 143 and the locking member 144 between the first support 141 and the second support 142 are also the same as those of the embodiment above; thus, the repeated details are omitted herein.

Figure 8:
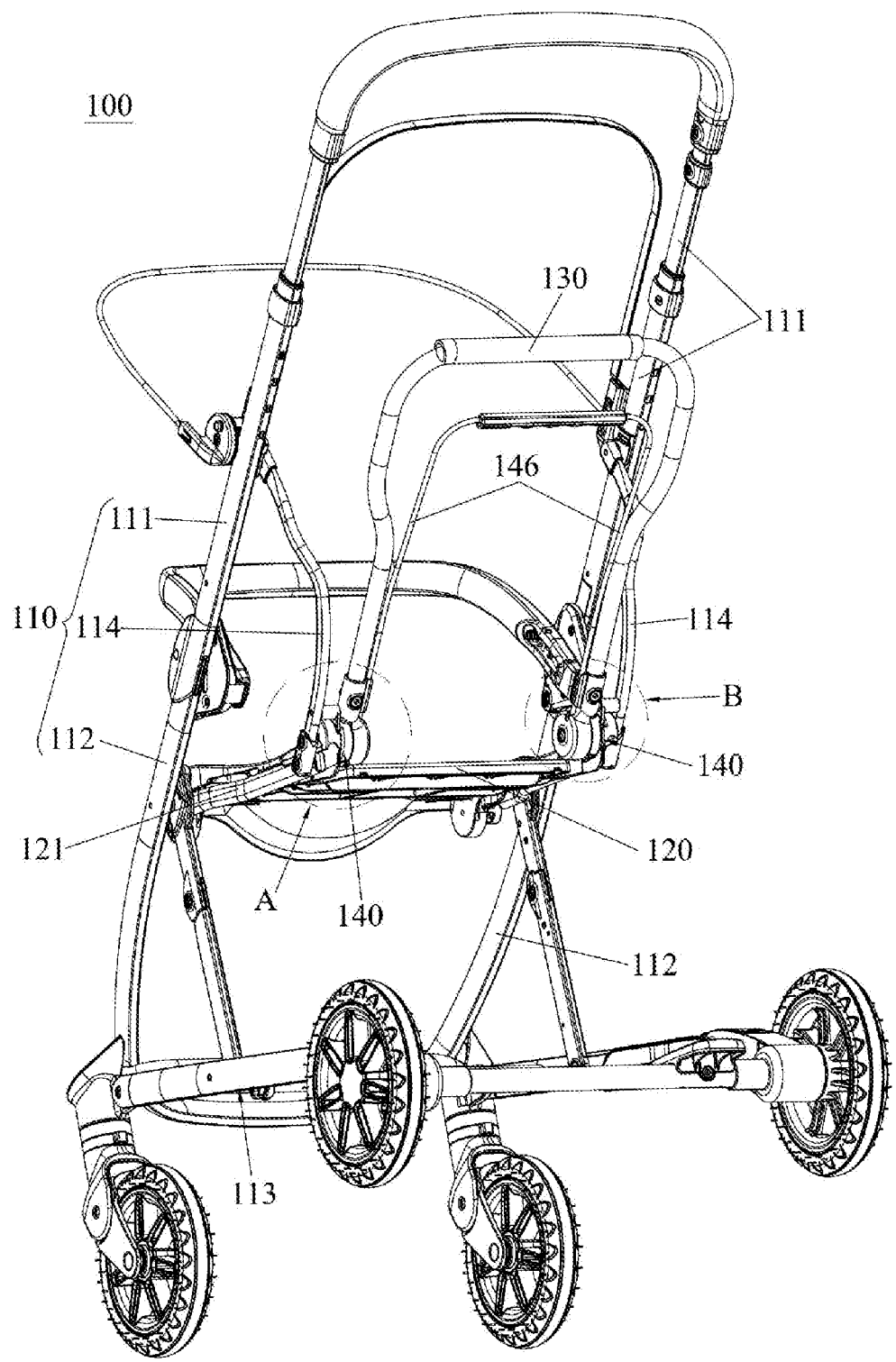
FIG. 8 is a structural schematic diagram of a baby stroller according to another embodiment of the present invention.
Figure 11:
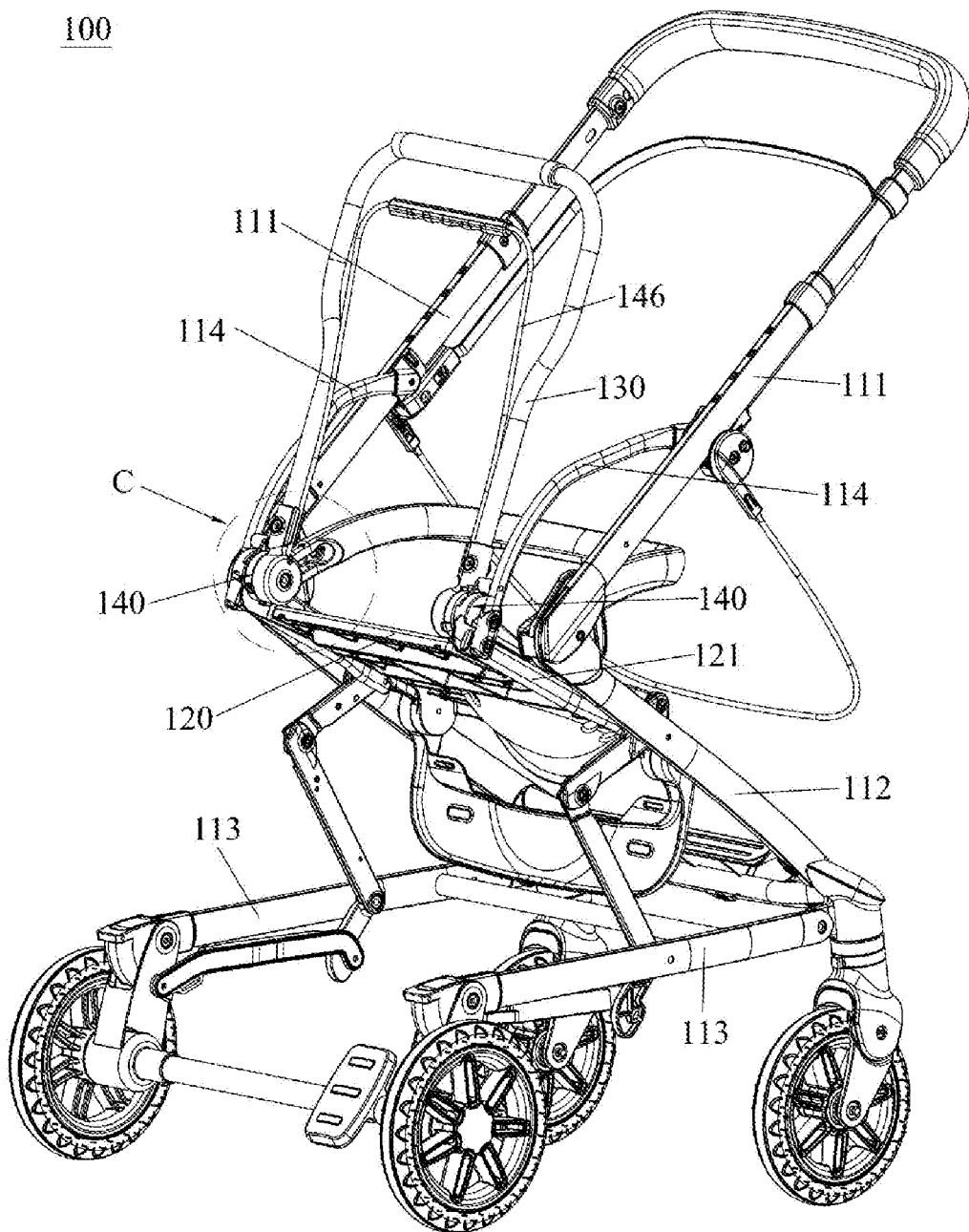
FIG. 11 is a schematic diagram of a semi-folded state of the baby stroller in FIG. 8.
Figure 12:
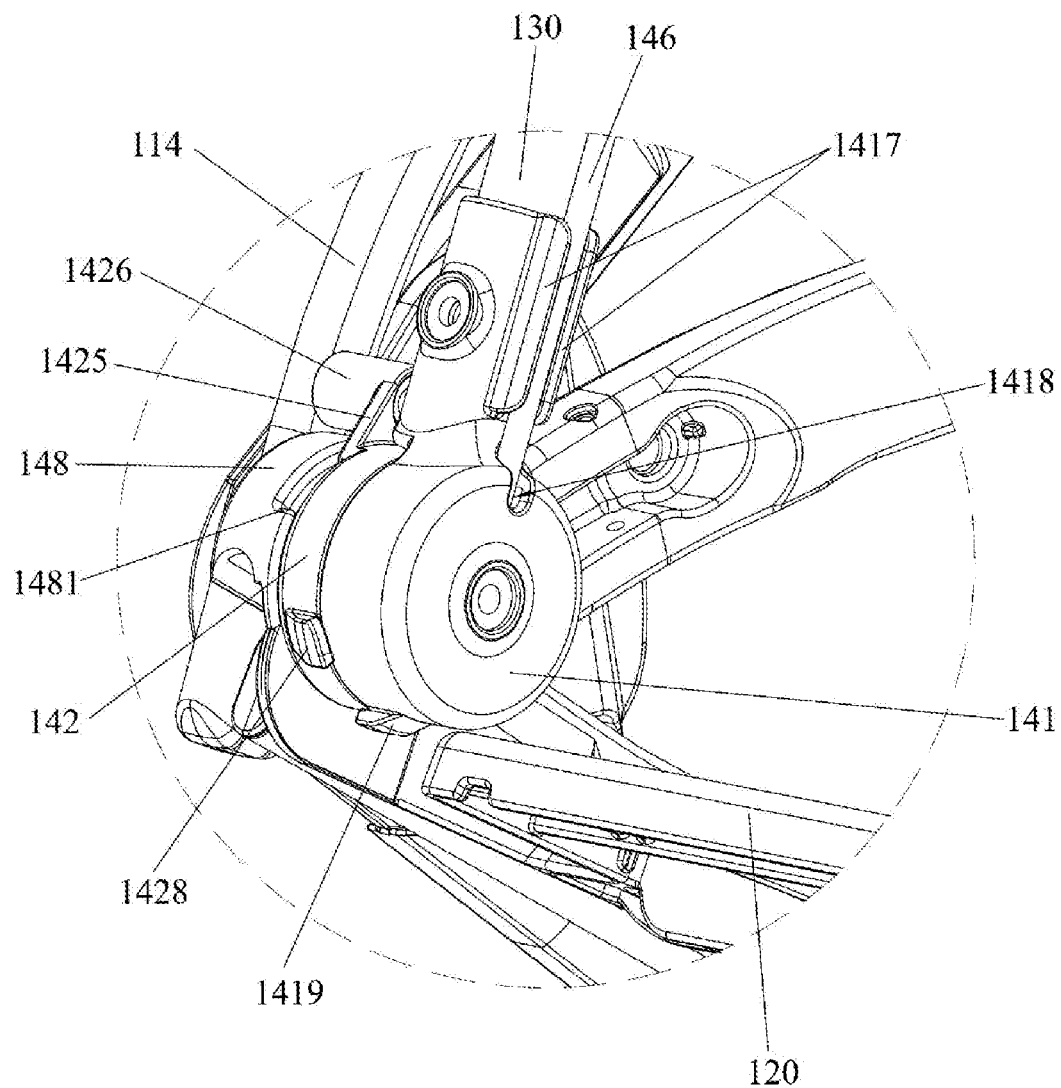
FIG. 12 is an enlarged schematic diagram of part C in FIG. 11.
Figure 14:
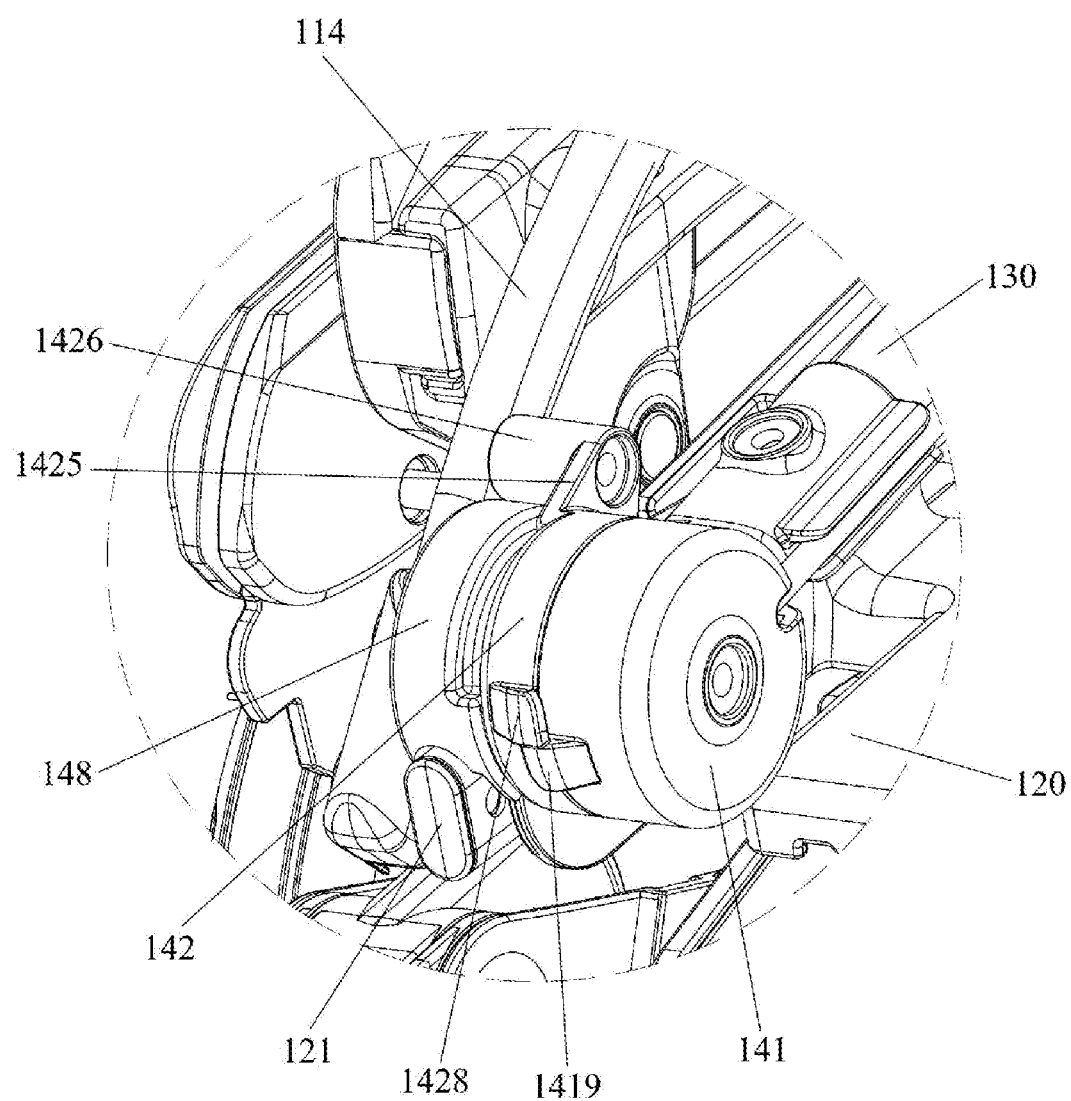
FIG. 14 is an enlarged schematic diagram of part D in FIG. 13.

Again referring to FIGS. 8 to 14, regarding the baby stroller 100 of this embodiment, the method for adjusting the angle of the backrest tube 130 when the stroller frame 110 is in an unfolded state are the same as those of the embodiment above. When folding is desired, the stroller arm 111 is pushed to pivotally rotate toward the front of the baby stroller 100, the stroller arm 111 pivotally rotates relative to the front leg 112 and folds downward to approach the front leg 112, and at the same time the front leg 112 pivotally rotates relative to and approaches the chassis 113, as shown in FIG. 11. During the pivotal rotation of the stroller arm 111, it drives and moves the seat pipe 121 by the frame linking rod 114, such that the seat pipe 121 pivotally rotates relative to the front leg 112 to further drive the seat 120 to move and fold. The frame linking rod 114 during the moving process drives the second support 142 connected thereto to rotate relative to the third support 148, so as to drive the first support 141 and the backrest tube 130 to pivotally rotate simultaneously, hence achieving synchronous folding of the entire backrest assembly, as shown in FIG. 11. Moreover, when the backrest tube 130 is pushed further to fold, the backrest tube 130 drives the first support 141 to pivotally rotate relative to the second support 142. When the first limiting block 1419 on the first support 141 interferes with second limiting block 1428, the backrest tube 130 cannot be pushed further for pivotal rotation, hence preventing the backrest tube 130 from being pushed excessively forward, as shown in FIGS. 13 and 14. Correspondingly, during unfolding of the stroller frame 110, the frame linking rod 114 drives the second support 142 to pivotally rotate relative to the third support 148, so as to drive the entire backrest assembly to unfold along with the stroller frame 110. Once the backrest tube 130 is unfolded to a certain extent, the first limiting block 1419 at the bottom of the first support 141 also interferes with the second limiting block 1428, thus preventing the backrest tube 130 from excessively pivotally rotating backward, as shown in FIGS. 8 to 10. Thus, the stroller frame 110 is able to drive the seat 120 and the backrest tube 130 to fold and unfold automatically, providing the baby stroller 100 with a simpler folding operation. Once folded, the stroller arm 111, the front leg 112, the chassis 113, the seat 120 and the backrest tube 130 are in a stacked state, as shown in FIG. 13.

In conclusion, in the backrest angle adjusting mechanism 140 of the present invention, a plurality engaging stages are formed between the first support 141 and the second support 142, the locking member 144 is slidably provided between the first support 141 and second support 142 and has a lock position and a release position, and the locking member 144 can be engaged at any engaging stage when at the lock position. Thus, when the driving member 145 moves, the locking member 144 is driven and slid to the release position, thereby implementing angle adjustment of the backrest tube 130. During a folding process of the stroller frame 110, automatic folding of the backrest tube 130 can be achieved by folding the frame stroller 110 or by a seat fabric pulling the backrest tube 130 that then moves with the stroller frame 110, thereby better simplifying operations of angle adjustment of the backrest tube 130 and folding of the baby stroller 100.

Correspondingly, the baby stroller 100 having the backrest angle adjusting mechanism 140 of the present invention also has the same effects.

The structures, arrangements and operating principles of the stroller frame 110 and the seat 120 of the baby stroller 100 of the present invention are conventional design in the art, and associated details are omitted herein.

Compared to the prior art, in the backrest angle adjusting mechanism of the present invention, a plurality of engaging stages are formed between the first support and the second support, the locking member is slidably provided between the first support and the second support and has a lock position and a release position, and the locking member is engaged at any engaging stage when at the lock position. Thus, when the driving member moves, the locking member is driven to slide to the release position, thereby implementing angle adjustment of the backrest tube. During a folding process of the stroller frame, automatic folding of the backrest tube can be achieved by folding the frame stroller or by a seat fabric pulling the backrest tube that then moves with the stroller frame, thereby better simplifying operations of angle adjustment of the backrest tube and folding of a baby stroller. Correspondingly, the baby stroller having the backrest angle adjusting mechanism of the present invention has the same effects.

The preferred embodiments of the present invention are disclosed above, and are not to be construed as limitations to the scope of claims of the present invention. Therefore, all equivalent modifications made to the claims of the present invention are to be encompassed within the scope of the present invention.

What is claimed is:

1. A baby stroller comprising a stroller frame, a seat provided at the stroller frame, a backrest tube, the baby stroller comprising:
   a first support for connecting to one of the backrest tube and the stroller frame;
   a second support connected to the other one of the backrest tube and the stroller frame;
   a third support connected to a rear end of a seat of the baby stroller;

wherein the second support is pivotally connected between the first support and the third support;

wherein the stroller frame drives the second support to pivotally rotate relative to the third support during folding of the stroller frame so as to drive entire backrest assembly of the baby stroller to pivotally rotate and fold;

wherein the stroller frame drives the second support to pivotally rotate relative to the third support during unfolding of the stroller frame so as to drive entire backrest assembly of the baby stroller to pivotally rotate and unfold.

2. The baby stroller according to claim 1, wherein a plurality of engaging stages are formed between the first support and the second support, the baby stroller comprising:
a locking member slidably arranged between the first support and the second support and having a lock position and a release position, the locking member being engaged at any of the engaging stages when at the lock position, the locking member being driven to slide and depart from the engaging stage so as to be located at the release position when the first support and the second support are relatively pivotally rotated.

3. The baby stroller according to claim 2, further comprising:
a reset member arranged between the first support and the second support and interfering with the locking member, the reset member providing the locking member with a tendency of constantly sliding from the release position to the locking position;
wherein the baby stroller comprising a driving member movably arranged between the first support and the second support and matching with the locking member; optionally, wherein the reset member and the driving member are arranged on two sides of the locking member, respectively.

4. The baby stroller according to claim 3, wherein a first accommodating cavity is formed at the first support, a first column is provided in a projecting manner in the first accommodating cavity, a second accommodating cavity matching with the first accommodating cavity is provided on the second support, a second column corresponding to the first column is provided in a projecting manner in the second accommodating cavity, a pivot axis of the first support and the second support is arranged in a through manner at the first column and the second column, and all the reset member, the locking member and the driving member are arranged in a through manner at the first column and the second column.

5. The baby stroller according to claim 2, wherein the locking member is simultaneously engaged with the first support and the second support when located at the lock position, and the locking member departs from the first support or the second support when slid to the release position.

6. The baby stroller according to claim 2, wherein the locking member is provided with at least one tooth at an interval along a circumferential direction thereof, the first support and the second support are provided with a plurality of slots matching with the tooth, and the tooth is selectively fitted in any of the slots.

7. The baby stroller according to claim 6, wherein inner walls of the first support and the second support are correspondingly provided with a plurality of engaging blocks in a projecting manner, and the slot corresponding to the tooth is formed between the two adjacent engaging blocks.

8. The baby stroller according to claim 7, wherein a first driving sloped surface is formed on an end portion of the engaging block; when the first support and the second support are relatively pivotally rotated, the first driving sloped surface pushes the tooth so as to slide the locking member to the release position.

9. The baby stroller according to claim 1, wherein a first limiting block is further provided in a projecting manner at a bottom of the first support and a second limiting block is further provided in a projecting manner at a bottom of the second support; when the first support and the second support are relatively pivotally rotated, the first limiting block and the second limiting block mutually interfere so as to limit a position of the backrest tube.

10. The baby stroller according to claim 1, wherein the stroller frame comprising a frame linking rod, wherein the second support is connected to the frame linking rod, wherein the first support is connected to the backrest tube, and frame linking rod drives the second support to pivotally rotate relative to the third support when the stroller frame folded or unfolded so as drive the backrest tube to fold or unfold.

11. The baby stroller according to claim 10, wherein a connecting ear is provided in an upward projecting manner on a top side edge of the second support, and the connecting ear is provided with a connecting column in a vertically projecting manner and is connected to the frame linking rod by the connecting column.

12. The baby stroller according to claim 11, wherein a first interference portion is formed at a joint between the connecting ear and the top side edge of the second support, a second interference portion matching with the first interference portion is formed on an outer edge of the third support, and a rotation position of the second support is limited by matching of the first interference portion and the second interference portion.

13. The baby stroller according to claim 1, wherein the backrest angle adjusting mechanism comprising:
a locking member slidably arranged between the first support and the second support and having a lock position and a release position, the locking member being engaged at any of the engaging stages when at the lock position, the locking member being driven to slide and depart from the engaging stage when located at the release position;
a driving member movably arranged between the first support and the second support and matching with the locking member, wherein the locking member is driven to slide to the release position by moving the driving member; and
an adjusting member connected to the driving member and provided for driving the driving member to move.

14. A backrest angle adjusting mechanism for adjusting an angle of a backrest tube relative to a stroller frame of a baby stroller, comprising:
a first support for connecting to one of the backrest tube and the stroller frame;
a second support connected to the other one of the backrest tube and the stroller frame;
a locking member slidably arranged between the first support and the second support and having a lock position and a release position; and
a driving member movably arranged between the first support and the second support and matching with the locking member;
wherein the driving member has a second driving sloped surface exhibiting an included angle relative to a moving direction thereof, and a side surface of the locking member is provided with a driven sloped surface matching with the second driving sloped surface; when the driving member moves, the second driving sloped surface pushes the driven sloped surface so as to slide the locking member to the release position; wherein the moving direction of the driving member and a sliding direction of the locking member are staggered.

15. The backrest angle adjusting mechanism according to claim 14, wherein the locking member is slidable along a pivot axis of the first support and the second support, and the driving member is movably arranged in a through manner at pivot axis by a long groove provided thereon.

16. The backrest angle adjusting mechanism according to claim 15, wherein the backrest angle adjusting mechanism comprising an adjusting member connected to the driving member and provided for driving the driving member to move; wherein the driving member is provided with an engaging hole, a hook is formed on one end of the adjusting member, the hook is connected in the engaging hole, and one other end of the adjusting member extends out of the first support or the second support.

17. The backrest angle adjusting mechanism according to claim 16, wherein a connecting pipe is provided in a protecting manner on an upper end of the first support or the second support, the connecting pipe is for connecting the backrest tube, two spaced ribs are provided in a projecting manner on an outer wall of the connecting pipe, and the adjusting member is engaged between the two ribs.

18. The backrest angle adjusting mechanism according to claim 14, wherein the backrest angle adjusting mechanism comprising:
an adjusting member connected to the driving member and provided for driving the driving member to move;
wherein the adjusting members of the two backrest angle adjusting mechanisms are connected into an integral, and the locking members of the two backrest angle adjusting mechanisms are driven and released synchronously by the adjusting members.

19. The backrest angle adjusting mechanism according to claim 18, wherein the two adjusting members are formed of a rigid material into a substantially U-shaped structure.

20. The backrest angle adjusting mechanism according to claim 14, wherein the stroller frame comprises a stroller arm and a front leg that are pivotally connected, the seat is pivotally connected to the front leg by a seat pipe, a frame linking rod is pivotally connected between the stroller arm and the seat pipe.

\* \* \* \* \*